UNITED STATES PATENT OFFICE.

EDWARD GOODRICH ACHESON, OF NEW YORK, N. Y.

INK AND PROCESS OF MAKING SAME.

1,201,994.     Specification of Letters Patent.    Patented Oct. 17, 1916.

No Drawing.    Application filed May 23, 1916. Serial No. 99,457.

*To all whom it may concern:*

Be it known that I, EDWARD G. ACHESON, a citizen of the United States, residing at New York, in the county of New York and State of New York, have invented certain new and useful Improvements in Inks and Processes of Making Same, of which the following is a specification.

In my prior patents and publications, (see for example U. S. Patents 843,426 of February 5, 1907; 844,989 of February 19, 1907; 895,063 of August 4, 1908; 911,358 of February 2, 1909; 931,832 of August 24, 1909; 964,478 of July 19, 1910; 986,793 of March 14, 1911; 1,030,372 of June 25, 1912), I have described certain methods of deflocculating amorphous bodies, including graphite and other forms of carbon by acting thereon with certain organic substances having effects like those of tannin. For example the amorphous material in finely-subdivided form is kneaded or worked for some hours with aqueous solutions of tannin- or dextrin-like bodies, after which the deflocculated portion, which is characterized by being suspensible in water for indefinite periods, is floated off from the residual material, collected in paste form, and if desired transferred to media other than water, such as oils, etc. These processes need not be here described in detail, inasmuch as operating methods are fully disclosed in my said prior patents.

In my prior Patent No. 911,358, I have pointed out that when lampblack is deflocculated in this manner, and the deflocculated product transferred to a suitable non-aqueous vehicle or medium, such as linseed oil, the resulting suspension is well adapted for use as an ink. My present invention relates to a simplified process of making such inks, and especially printers' inks, and to the ink prepared by such simplified process.

Inks are prepared according to this invention by subjecting the desired pigment material, usually lampblack, carbon black, or other suitable form of carbon, to the action of a deflocculating agent under more or less prolonged kneading; but instead of thereafter effecting a substantially complete separation between the deflocculated and the non-deflocculated portions of the material, I transfer both such portions to the appropriate non-aqueous ink vehicle. Or if preferred, I separate a portion only of the non-deflocculated material from the mixture and collect and transfer to the desired vehicle the remaining mixture of deflocculated and non-deflocculated materials.

It is of course to be desired in the manufacture of printers' inks and analogous compositions, including paints, that the solid particles or pigments should be in such state of subdivision as completely to cover the portion of the paper or other surface to which they are applied. This requirement is of course fully met when the suspended matter of the ink is wholly in a deflocculated state, and is present in sufficient proportion to the vehicle to possess the necessary hiding power. But I have discovered that the requirement is likewise fully met when a part only of the solid component of the ink is in the deflocculated state, the deflocculated material being in sufficient proportion to the whole to fill the interstices between the larger or non-deflocculated particles.

The proportion of the material which should exist in the deflocculated condition in order to achieve this result will of course depend upon a variety of factors; including the size and shape of the non-deflocculated particles. In the specific case of lampblack and carbon black, I have found that satisfactory results are obtained when I continue the treatment with the deflocculating agent until 25 per cent. or upward has undergone deflocculation, acquiring the property of permanent or at least indefinitely long suspensibility in water. At this point the process of deflocculation is arrested, and the treated material is directly used for the preparation of the ink, employing any desired or usual ink vehicle.

My invention is not limited to any particular formula, since this will necessarily vary somewhat widely according to the nature of the pigment body, and of the vehicle as well as the conditions of intended use. For the specific purpose of a printers' ink for newspaper work, I have incorporated lampblack having about 30 per cent. by weight in the deflocculated condition with a vehicle consisting of rosin oil and petroleum oil, a typical formula being—

Carbon _____ 15   per cent.
   Rosin oil_____  9.5  "   "
   Petroleum oil_____ 75.5  "   "

In practice, lampblack is preferred for ordinary printing, and carbon black for half-tone work, blue being used to correct the brown tone if required.

It is characteristic of the products prepared as above that they work much easier than ordinary printing inks, and permit taking off a larger number of imprints in half-tone work before the plates require to be cleaned.

I claim:—

1. A composition of matter suitable for use as a printers' ink, comprising a mixture of deflocculated and non-deflocculated pigment particles, associated with an ink vehicle.

2. A composition of matter suitable for use as a printers' ink, comprising a mixture of deflocculated and non-deflocculated carbon particles, associated with an ink vehicle.

3. The process of making inks, which consists in partially deflocculating an amorphous pigment in presence of water and transferring deflocculated and non-deflocculated particles thereof to an ink vehicle.

In testimony whereof I affix my signature in presence of two witnesses.

EDWARD GOODRICH ACHESON.